United States Patent
Maas et al.

(10) Patent No.: US 10,293,321 B2
(45) Date of Patent: May 21, 2019

(54) TRAY SUPPORT INSERTS FOR CHEMICAL REACTOR VESSELS AND METHODS OF USE

(71) Applicant: SHELL OIL COMPANY, Houston, TX (US)

(72) Inventors: Edwin Maas, Katy, TX (US); Remco Schilthuizen, Amsterdam (NL)

(73) Assignee: SHELL OIL COMPANY, Houston, TX (US)

( * ) Notice: Subject to any disclaimer, the term of this patent is extended or adjusted under 35 U.S.C. 154(b) by 205 days.

(21) Appl. No.: 15/382,804

(22) Filed: Dec. 19, 2016

(65) Prior Publication Data

US 2017/0173547 A1    Jun. 22, 2017

Related U.S. Application Data

(60) Provisional application No. 62/270,617, filed on Dec. 22, 2015.

(51) Int. Cl.
| | |
|---|---|
| *B01J 8/02* | (2006.01) |
| *B01J 8/04* | (2006.01) |
| *C10G 45/00* | (2006.01) |
| *C10G 47/02* | (2006.01) |
| *F16M 13/02* | (2006.01) |

(52) U.S. Cl.
CPC .............. *B01J 8/02* (2013.01); *B01J 8/0278* (2013.01); *B01J 8/0453* (2013.01); *B01J 8/0492* (2013.01); *C10G 45/00* (2013.01); *C10G 47/02* (2013.01); *F16M 13/02* (2013.01); *B01J 2208/00884* (2013.01); *B01J 2208/027* (2013.01); *B01J 2219/00024* (2013.01)

(58) Field of Classification Search
CPC . B01J 8/02; B01J 8/0492; B01J 8/0453; B01J 8/0278; B01J 2219/00024; B01J 2208/00884; B01J 2208/027; C10G 47/02; C10G 45/00; F16M 13/02
See application file for complete search history.

(56) References Cited

U.S. PATENT DOCUMENTS

2005/0163682 A1*  7/2005  Jacobs ................ B01D 3/20
                                                422/228

* cited by examiner

*Primary Examiner* — Randy Boyer
*Assistant Examiner* — Juan C Valencia

(57) ABSTRACT

A tray support insert and method of use for supporting one or more trays within a reactor chamber. The tray support insert includes at least one annular member which rests upon a support shoulder within the reactor chamber.

10 Claims, 7 Drawing Sheets

TRAY SUPPORT INSERTS FOR CHEMICAL REACTOR VESSELS AND METHODS OF USE

FIELD OF THE INVENTION

The invention relates generally to the arrangements for supporting trays of chemical or materials within chemical reactor vessels.

BACKGROUND OF THE INVENTION

Hydrotreating/hydroprocessing chemical reactor vessels, including catalytic reactors, are used extensively in many industries, including the petrochemical industry. Chemical reactor vessels are very large and heavy, and, as a result, are often built in-place with rolled or forged steel. A typical catalytic reactor is generally cylindrical and can be from about 10 to about 150 feet tall and 1-25 feet wide with walls having a thickness that can vary from about 2 inches to about 16 inches. A fluid feed is flowed into the upper end of the reactor vessel and through a series of trays, allowing catalyzed chemical processes to take place. During typical operation, the contents of a chemical reactor are subjected to high temperatures and pressures. During a typical catalytic reaction operation, the reactor vessel chamber might reach temperatures that can vary from 100 F to around 800 degrees F. and have an internal pressure of around 2500 psi and can vary between 90 psi to around 3000 psi. Trays supported within the reactor chamber can expand or contract thermally, shifts or otherwise move, resulting in damage to reactor components. The term "tray," as used herein, generally refers to a platform having a round outer perimeter which is sized to fit within a reactor chamber and which carries a bed of catalyst, quenching matter, screens or other materials used in the catalytic process.

In addition, the inventor has determined that there are instances wherein it is desirable to alter the internal configuration of the reactor chamber in order to accommodate changes in the chemical feed provided to the reactor or processes that are to be carried out within the reactor vessel.

SUMMARY OF THE INVENTION

The invention provides a hydrocarbon chemical (hydrotreating/processing) reactor vessel having a tray support insert which can support one or more trays. In described embodiments, the tray support insert can support a number of trays or beds within the reactor chamber while permitting relative movement between a tray and insert and the walls of the surrounding vessel. The tray support insert allows for expansion and contraction of metal components within the reactor in response to changes in temperature and pressure. In accordance with a particular described embodiment, the tray support insert is used to support the quench section of the reactor within the reactor chamber. When the tray support insert is used, the quench section is seated at a heightened elevation within the reactor chamber as compared to a configuration in which the tray support insert is not used. Thus, use of the tray support insert permits the quench section, including quench tray and high dispersion tray, of an existing reactor to be moved axially upwardly within the reactor chamber and yet still be supported in a robust manner which can handle heavy weight and intense heat. Movement of the quench section will reduce the size of the reactor chamber which can contain an upper bed of catalyst but increase the size of the reactor chamber which can contain a lower bed of catalyst, thereby accommodating particular changes to the chemical processes which can be carried out within the reactor vessel.

A reactor vessel is described in which a cylindrical reactor chamber is defined within a reactor housing. A support shoulder is formed on the interior surface of the reactor housing and is used to bear a tray support insert in accordance with the present invention. The tray support insert includes at least one annular member which is seated upon the support shoulder and which provides a supporting surface for a tray. The at least one annular member defines a central opening through which fluid feed can pass. Preferably, the tray support insert is made up of a plurality of separate arcuate segments that are secured together to form a complete annular structure. In accordance with preferred embodiments, the tray support insert is formed of stainless steel.

An exemplary tray support insert is described which includes a support grid skirt and a catalyst support grid ring. The described support grid skirt includes an annular skirt frame and support blocks that extend axially downwardly from the skirt frame. Support members extend axially upwardly from the skirt frame. The described catalyst support grid ring is stacked on top of the support grid skirt. Both the support grid skirt and catalyst support grid ring present lips or ledges upon which one or more trays can be supported. Use of the tray support insert allows spacing between the tray and the interior surface of the reactor chamber which will accommodate expansion, contraction and other movement of the trays within the reactor chamber during use. The support grid skirt and catalyst support grid ring are each preferably formed of separate arcuate segments so that they can be disassembled and the segments easily disposed into an opening in the reactor vessel. Once inside the reactor vessel, the support grid skirt and catalyst support grid ring can be assembled to form complete annular structures.

The invention also provides methods for supporting a tray within a reactor vessel chamber. In accordance with these methods, a tray support insert is disposed upon a support shoulder within the reactor chamber. In certain embodiments, components of a tray support insert are disposed into the reactor chamber, and the tray support insert is then assembled within the reactor chamber upon the support shoulder. One or more trays are then supported upon the tray support insert. A hydrocarbon chemical feed is then flowed into the reactor vessel. The chemical feed travels downwardly within the reactor chamber, through trays that are supported within the reactor chamber by the tray support insert.

BRIEF DESCRIPTION OF THE DRAWINGS

For a thorough understanding of the present invention, reference is made to the following detailed description of the preferred embodiments, taken in conjunction with the accompanying drawings, wherein like reference numerals designate like or similar elements throughout the several figures of the drawings and wherein.

DETAILED DESCRIPTION OF THE PREFERRED EMBODIMENTS

Figure 1:
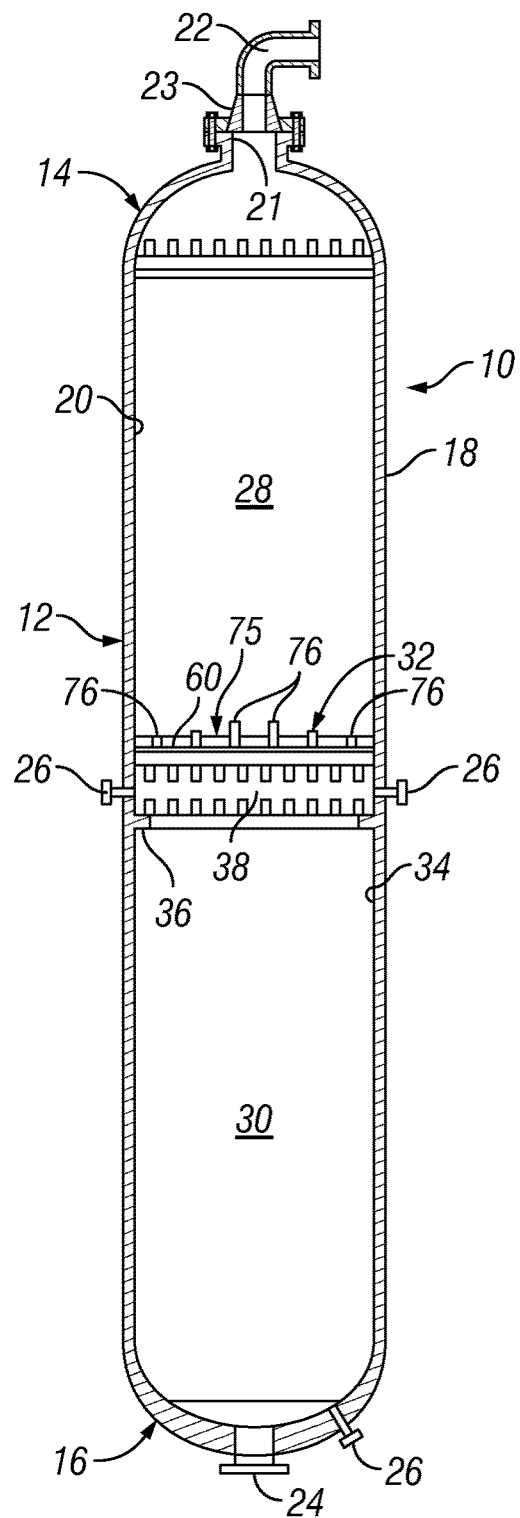
FIG. 1 is a side, cross-sectional view of an exemplary chemical reactor vessel with a support tray assembly located within.
Figure 2:
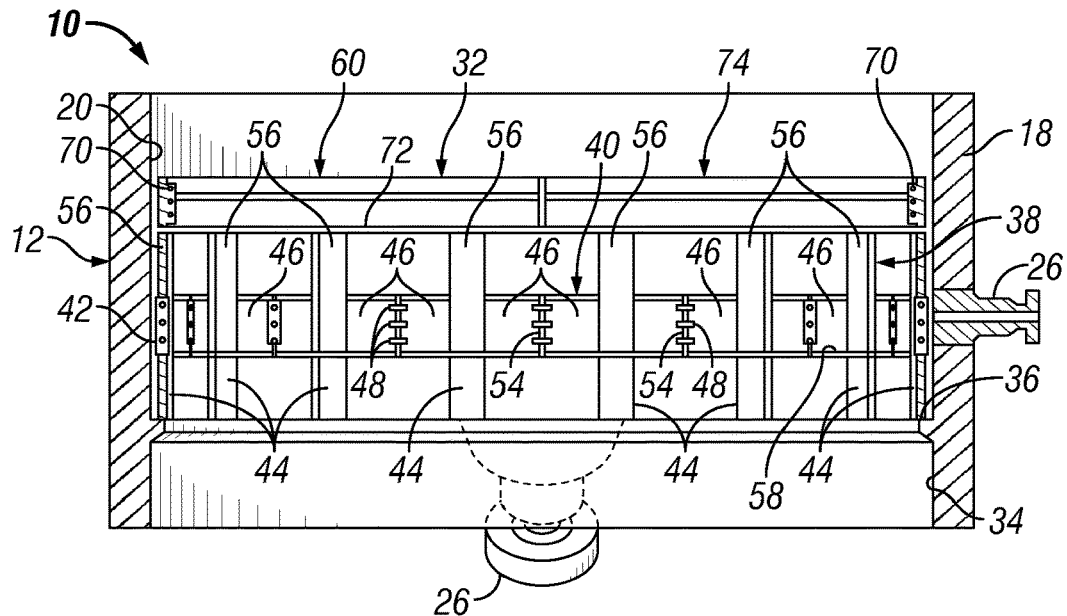
FIG. 2 is a side, cross-sectional view of a portion of the reactor vessel which includes components of a support tray assembly constructed in accordance with the present invention.
Figure 3:
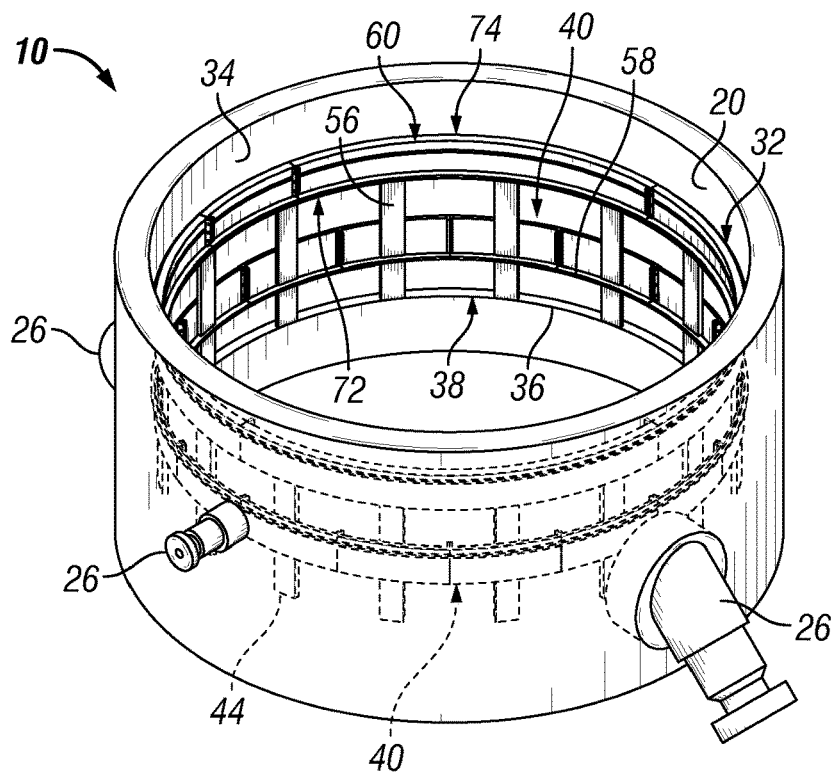
FIG. 3 is a transparent isometric view of a portion of the reactor vessel which includes components of a support tray assembly constructed in accordance with the present invention.

FIG. 1 depicts an exemplary chemical reactor vessel 10 constructed in accordance with the present invention. The reactor vessel 10 is preferably a catalytic reactor which will contain one or more trays of catalyst material. The reactor vessel 10 includes a central reactor barrel 12, top head portion 14 and bottom portion 16. The reactor vessel 10 includes a reactor housing 18 which is typically formed of forged carbon steel. The reactor housing 18 defines a reactor chamber 20 within. The central reactor barrel 12 of the reactor vessel 10 is typically cylindrical in shape resulting in the reactor wall 18 there having a circular cross-sectional shape. A feed inlet 22 allows chemical feed to be treated to enter the reactor chamber 20. In the depicted embodiment, the feed inlet 22 is located in the top head portion 14 of the reactor vessel 10. The feed inlet 22 is secured within a removable cover 23 that is affixed to a restricted diameter opening 21 using threaded connectors. A feed outlet 24 is disposed through the bottom portion 16 of the reactor vessel 10. A number of flow nozzles 26 are also disposed through the reactor housing 18.

Upper and lower catalyst beds 28, 30, respectively, are contained within the reactor chamber 20. A tray support insert, generally indicated at 32, supports the upper catalyst bed 28. The tray support insert 32 will be described in greater detail shortly. The reactor housing 18 presents an inner surface 34. An inwardly-projecting support shoulder 36 is formed upon the inner surface 34.

Figure 4:
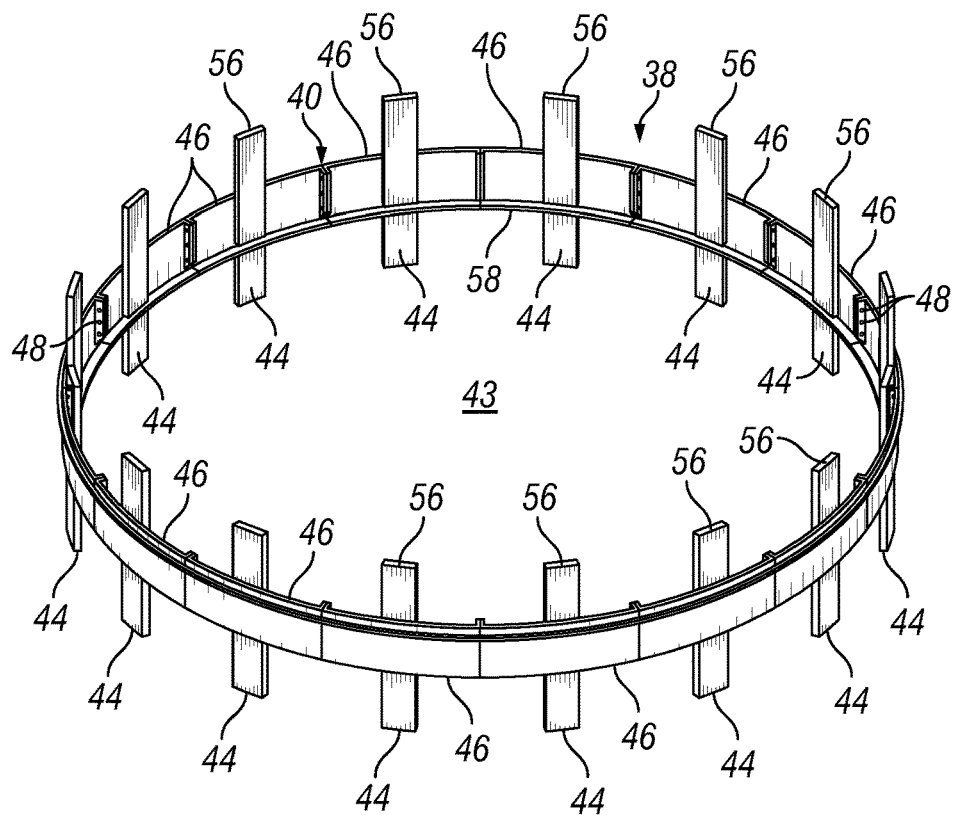
FIG. 4 is an isometric view of an exemplary support grid skirt shown apart from the other components of the support tray assembly.

The exemplary tray support insert 32 includes a support grid skirt 38 which rests upon the support shoulder 36. An exemplary support grid skirt 38 is shown in FIG. 4. In preferred embodiments, the support grid skirt 38 is formed of stainless steel. The support grid skirt 38 includes an annular skirt frame 40 which is sized to reside loosely within the reactor chamber 20 with some spacing 42 left between the frame 40 and the inner surface 34. In exemplary embodiments, the spacing 42 is from about 10 mm to about 20 mm. A central opening 43 is defined within the skirt frame 40. A plurality of support blocks 44 extend axially downwardly from the annular skirt frame 40. The support blocks 44 rest upon the support shoulder 36. In accordance with preferred embodiments, the annular skirt frame 40 is made up of a plurality of arcuate segments 46 which are assembled together with threaded connectors 48 to form a complete annular frame.

Figure 5:
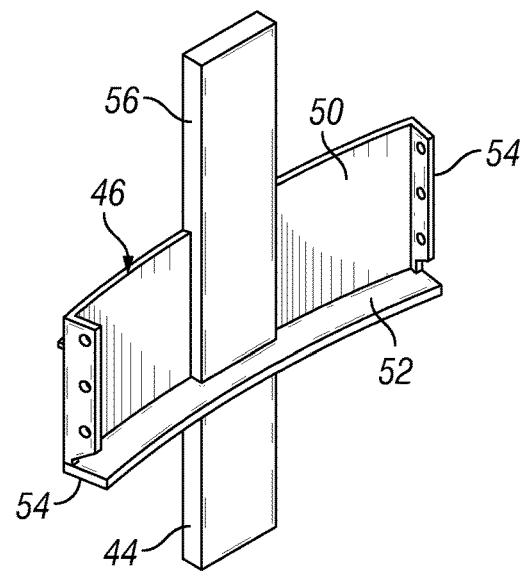
FIG. 5 is a detail isometric view of an individual arcuate segment of the support grid skirt.

A single arcuate segment 46 is depicted in FIG. 5. Each arcuate segment 46 preferably includes a curved vertical panel 50 with an inwardly projecting lip or support ring 52 at its lower end. Perforated flanges 54 are formed at either arcuate end of the panel 50 which permit the segment 46 to be secured together with a neighboring segment 46 using connectors 48. Each arcuate segment 46 includes a support member 56 which extends upwardly from the curved vertical panel 50. When the support grid skirt 38 is assembled, the lips 52 of each arcuate segment 46 collectively form a support platform 58. In accordance with preferred embodiments, the support platform 58 is used to provide support for a high dispersion tray of a type known in the art.

Figure 6:
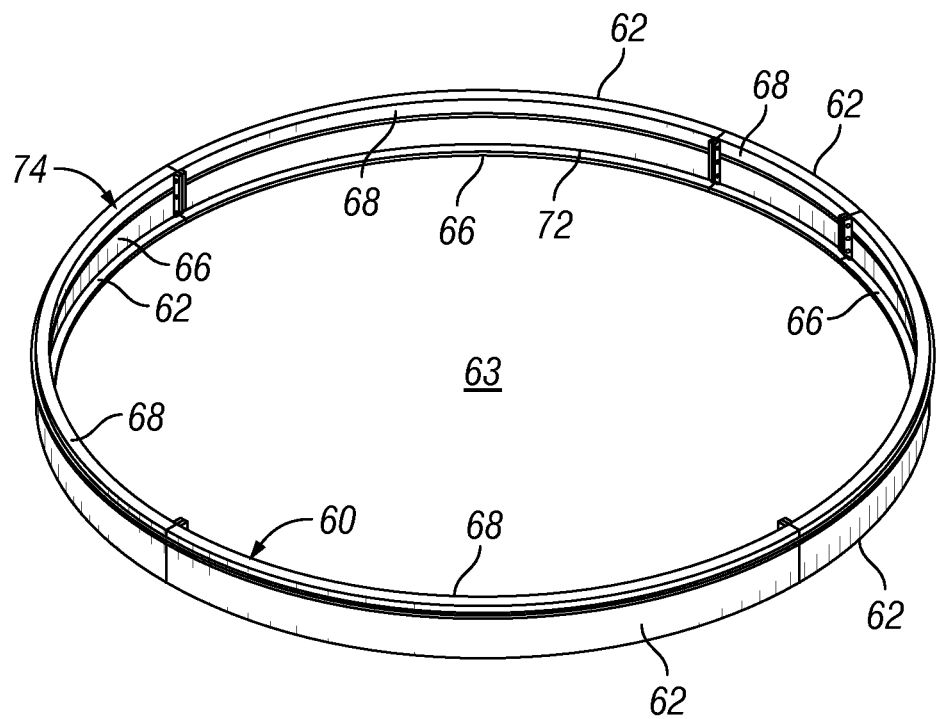
FIG. 6 is an isometric view of an exemplary catalyst support grid ring used in the support tray assembly.
Figure 7:
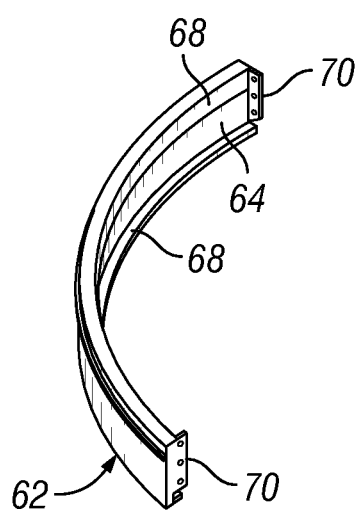
FIG. 7 is an isometric view of an exemplary ring segment from the catalyst support grid ring.

A catalyst support grid ring 60 rests atop the support grid skirt 38. Features of an exemplary catalyst support grid ring 60 are better shown in FIGS. 6 and 7. The catalyst support grid ring 60 is preferably made up of a plurality of ring segments 62 which are secured together to form a complete annular ring 60 and defining a central opening 63. Each of the ring segments 62 presents a substantially vertical panel 64 with a lower lip 66 that projects inwardly therefrom. A rectangular box portion 68 is formed at the upper end of the panel 64 and also projects inwardly from the panel 64. Perforated end flanges 70 are formed at the arcuate ends of each ring segment 62 so that neighboring ring segments 62 can be affixed together using threaded connectors or the like. When the catalyst grid support grid ring 60 is assembled, the lower lips 66 of the ring segments 62 collectively form a tray support ledge 72. In particular embodiments, the tray support ledge 72 is used to support a quench tray. Also when assembled, the rectangular box portions 68 collectively present a circular upper support surface 74.

Figure 8:
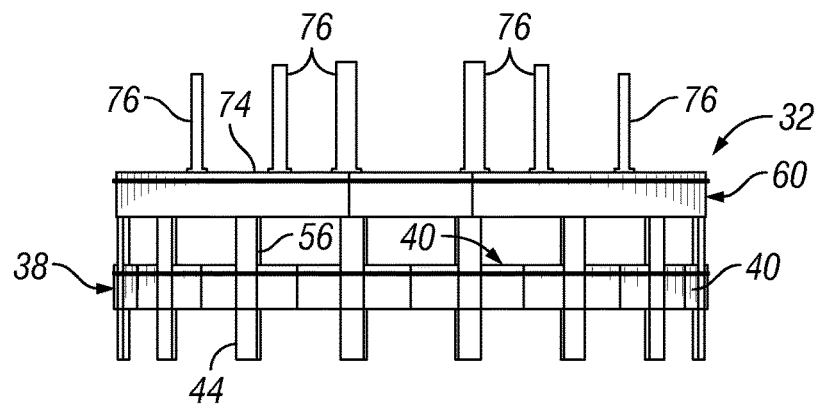
FIG. 8 is a side view of an exemplary reactor vessel, now with support girders placed atop the support tray assembly.
Figure 9:
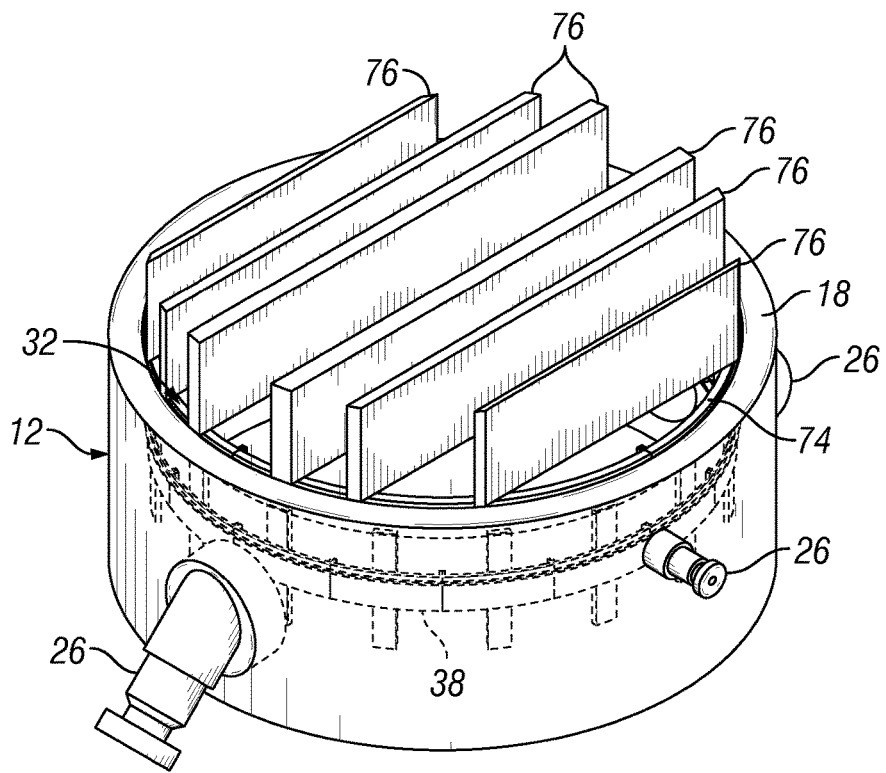
FIG. 9 is a transparent, isometric view of a portion of the reactor vessel which includes a support tray assembly and several support girders.

FIGS. 8 and 9 depict the support tray assembly 32 now with a catalyst support grid 75 having been placed upon the circular upper support surface 74. The catalyst support grid 75 is used to support the upper bed 28 of catalyst and includes several support beams 76 and grid panels 77 (in FIG. 10) which are secured between the support beams 76. During operation of the chemical reactor vessel 10, the support grid skirt 38 and catalyst support ring 60 of the support tray assembly 32 can expand and contract within the reactor chamber 20. Thermal expansion can be an issue due to different expansion coefficients of different types of steel used in construction of the reactor 10 (i.e., carbon versus stainless) and differences in heating and cooling rates due to the mass of the steel and the media inside the reactor 10. The reactor housing 18 heats and cools much slower relative to components inside of the reactor chamber 20.

Construction of the support grid skirt 38 and catalyst support ring 60 in separable arcuate segments 46, 62 is preferred since it permits the skirt 38 and ring 60 to be installed in existing reactors. Fully constructed reactors typically have an opening or hatchway that is of limited diameter. Individual segments 46 and 62 and other components can be readily inserted through the opening to the reactor chamber 20. Thereafter, the support grid skirt 38 and catalyst support ring 60 can be assembled within the reactor chamber 20.

Figure 10:
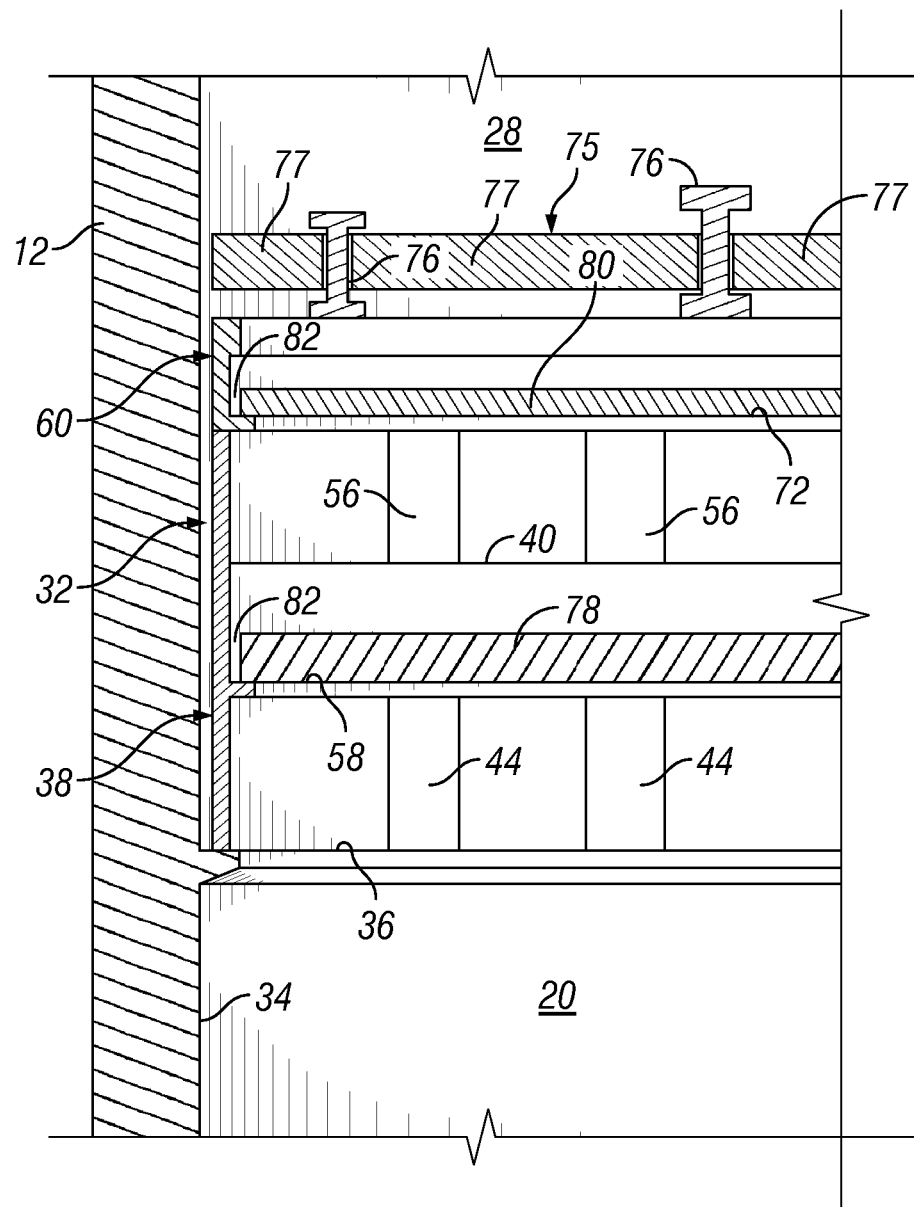
FIG. 10 is a schematic cross-sectional view depicting exemplary quench section trays supported within a reactor.

FIG. 10 is a schematic side, cross-sectional view of a quench section, generally indicated at 73, within a reactor chamber 20 which incorporates a tray support insert 32 in accordance with the present invention. A high dispersion tray 78 is shown supported on a first supporting surface which is provided by the support platform 58 of the support grid skirt 38. A quench tray 80 is supported upon a second supporting surface which is provided by the tray support ledge 72 of the catalyst support ring 60. Those of skill in the art will understand that a quench ring (not shown) would normally be located between the high dispersion tray 78 and the quench tray 80. In the depicted embodiment, lateral spacing 82 is provided between the edges of trays 78, 80 and the support grid skirt 38 or catalyst support ring 60 of the tray support insert 32. This spacing 82, in addition to the spacing 42 provided between the support grid skirt 38 and the interior surface 34 of the reactor chamber 20, will help accommodate thermal expansion, contraction or other shifting or movement of components within the reactor chamber 20. Catalyst support grid 75 will support the upper bed 28 of catalyst.

Figure 11:
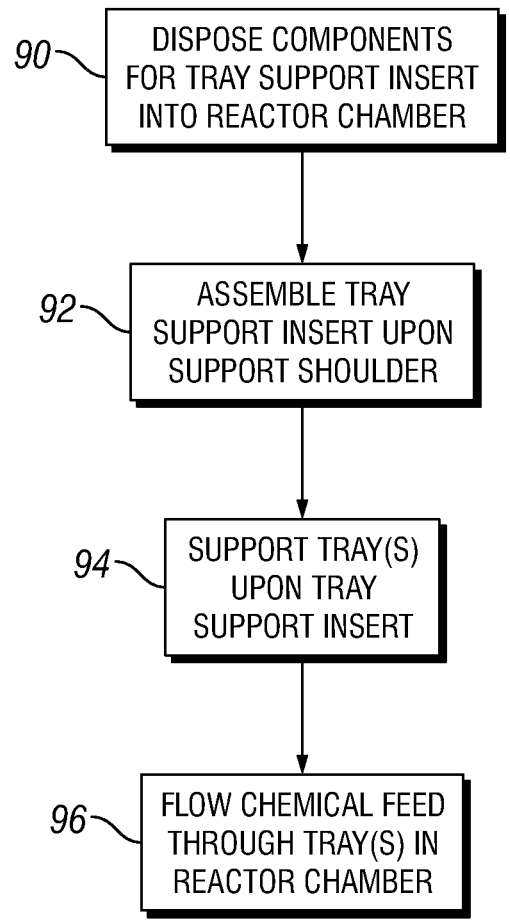
FIG. 11 is a flow diagram illustrating steps in an exemplary method for supporting a tray within a reactor chamber.

It is noted that the invention also provides methods for supporting one or more trays within a chemical reactor vessel chamber 20. FIG. 11 is a flow diagram illustrating steps in an exemplary method for supporting a tray within a chemical reactor chamber 20. In step 90, separate components for a tray support insert 38, including segments 46, 62 and connectors 48, are disposed into the reactor chamber 20. In order to do this, the cover 23 may be removed from the opening 21 of the reactor vessel 10 and the components inserted through the opening 21. In step 92, the tray support insert 38 is then assembled within the reactor chamber 20 and disposed upon the support shoulder 36. In step 94, one or more trays 78, 80 are then supported upon the tray support insert 38. In step 96, a chemical feed is then flowed into the reactor vessel 10 through feed inlet 22. The hydrocarbon chemical feed travels downwardly within the reactor chamber 20, through trays 78, 80 that are supported within the reactor chamber 20 by the tray support insert 38.

It is noted that use of tray support insert 38 in accordance with the present invention permits components within the reactor chamber 20 of an existing reactor to be reconfigured. The quench section 73 of the reactor 10, including quench tray 80 and high dispersion tray 78, will be supported at a higher elevation within the reactor chamber 20 than they would be when the tray support insert 38 is not used. As a result, the portion of the reactor chamber 20 which can contain the upper catalyst bed 28 will be reduced in size while the portion of the reactor chamber 20 which can contain the lower catalyst bed 30 will be enlarged. The inventor has determined that such a reconfiguration would be advantageous in instances wherein there are changes needed to the chemical yield of the reactor 10 or to the makeup of the chemical feed or catalyst being used.

Those of skill in the art will recognize that numerous modifications and changes may be made to the exemplary designs and embodiments described herein and that the invention is limited only by the claims that follow and any equivalents thereof.

The invention claimed is:

1. A tray support insert to support a tray within a reactor chamber of a hydrocarbon chemical reactor, the reactor chamber having an interior surface with a support shoulder formed thereon, the tray support insert comprising:
    at least one annular member further comprising:
        a support grid skirt which presents a first supporting surface for a first tray; and
        a catalyst support grid ring which is seated upon the support grid skirt and which presents a second supporting surface for a second tray;
        wherein the at least one annular member rests upon the support shoulder and presents a supporting surface for the first tray and the second tray;
        wherein the support grid skirt further comprises an annular skirt frame and a plurality of support members which extend axially away from the annular skirt frame and upon which the first tray can be supported; and
        wherein the catalyst support grid ring further comprises a vertical curved panel and
            a tray support ledge which projects radially inwardly from the panel and upon which the second tray can be supported.

2. The tray support insert of claim 1 wherein the at least one annular member is formed of stainless steel.

3. The tray support insert of claim 1 wherein the at least one annular member is formed of a plurality of separate arcuate segments which can be assembled together to form a complete annular structure.

4. The tray support system of claim 1 wherein the catalyst support grid ring further comprises a rectangular box portion which projects radially inwardly from the panel and which presents a supporting surface for a catalyst bed.

5. A tray support insert to support a tray within a reactor chamber of a chemical reactor, the reactor chamber having an interior surface with a support shoulder formed thereon, the tray support insert comprising:
    at least one annular member formed of stainless steel, the annular member comprising
        a support grid skirt which presents a first supporting surface for a first tray; and
        a catalyst support grid ring which is seated upon the support grid skirt and which presents a second supporting surface for a second tray;
    wherein the at least one annular member rests upon the support shoulder and presents a supporting surface for the first tray and the second tray; and
    wherein the support grid skirt comprises an annular skirt frame and a plurality of support members which extend axially away from the annular skirt frame and upon which the first tray can be supported; and
    wherein the catalyst support grid ring comprises a vertical curved panel and a tray support ledge which projects radially inwardly from the panel and upon which the second tray can be supported.

6. The tray support insert of claim 5 wherein the at least one annular member is formed of a plurality of separate arcuate segments which can be assembled together to form a complete annular structure.

7. The tray support insert of claim 5 wherein the catalyst support grid ring further comprises:
    a rectangular box portion which projects radially inwardly from the panel and which presents a supporting surface for a catalyst bed.

8. A method of supporting a tray upon a tray support insert within a reactor chamber of a chemical reactor vessel, the method comprising the steps of:
    disposing the tray support insert into the reactor chamber;
    disassembling the tray support insert into separate components after it is disposed into the reactor chamber;
    assembling the tray support insert from the separate components within the reactor chamber;
    disposing the assembled tray support insert upon a support shoulder that is formed within the
        interior surface of the chemical reactor vessel, the tray support insert comprising at least
        one annular member; and
    supporting the tray upon the tray support insert;
    wherein the step of disposing the tray support insert into the reactor chamber is carried out prior to the step of disposing the tray support insert upon the support shoulder.

9. The method of claim 8 further comprising the step of flowing a chemical feed through the tray within the reactor chamber.

10. The method of claim 8 wherein the step of supporting the tray upon the tray support insert further comprises:
supporting trays of a quench section upon supporting surfaces of the tray support insert; and
wherein supporting the trays of the quench section upon supporting surfaces of the tray support insert will locate the quench section at a higher elevation within the reactor chamber than would supporting the quench section within the reactor chamber without the tray support insert.

\* \* \* \* \*